(12) United States Patent
Acharya et al.

(10) Patent No.: US 10,719,506 B2
(45) Date of Patent: Jul. 21, 2020

(54) NATURAL LANGUAGE QUERY GENERATION

(71) Applicant: SAP SE, Walldorf (DE)

(72) Inventors: Pranav Acharya, Mumbai (IN); Raghavendra Nagaraja, Bangalore (IN)

(73) Assignee: SAP SE, Walldorf (DE)

( * ) Notice: Subject to any disclaimer, the term of this patent is extended or adjusted under 35 U.S.C. 154(b) by 481 days.

(21) Appl. No.: 15/388,464

(22) Filed: Dec. 22, 2016

(65) Prior Publication Data
US 2018/0181613 A1 Jun. 28, 2018

(51) Int. Cl.
*G06F 7/00* (2006.01)
*G06F 16/242* (2019.01)

(52) U.S. Cl.
CPC ................... *G06F 16/243* (2019.01)

(58) Field of Classification Search
CPC .. G06F 16/243; G06F 17/2705; G06F 17/304; G06F 16/24534; G06F 16/2456
USPC ......... 707/714, 718, 721, 760, 769
See application file for complete search history.

(56) References Cited

U.S. PATENT DOCUMENTS

| 8,260,769 B1* | 9/2012 | Fuller | G06F 16/2228 707/721 |
| 2012/0323885 A1* | 12/2012 | Wang | G06F 16/2456 707/714 |
| 2013/0013588 A1* | 1/2013 | Dewar | G06F 16/245 707/718 |

* cited by examiner

*Primary Examiner* — Md I Uddin
(74) *Attorney, Agent, or Firm* — Schwegman Lundberg & Woessner, P.A.

(57) ABSTRACT

Various examples are directed to converting a natural language query to a structured query. The natural language query may comprise a plurality of terms. A natural language system may generate a set of operators and a set of operands based at least in part on the plurality of terms and a metadata dictionary. The natural language system may generate an expression tree based at least in part on the set of operators and the set of operands. The expression tree may comprise a plurality of interconnected nodes. A first node may be associated with a first function corresponding to a first operator of the set of operators and a second node may be associated with a first argument of the first function corresponding to a first operand of the set of operands. The natural language system may generate a query based at least in part on the expression tree.

20 Claims, 11 Drawing Sheets

NATURAL LANGUAGE QUERY GENERATION

TECHNICAL FIELD

This document generally relates to methods and systems for use with computer networks. More particularly, this document relates to methods and systems for executing user requests, such as database requests, made in natural language.

BACKGROUND

Various computing applications receive and respond to queries. For example, a database management system may receive queries that request information that is stored at, or derivable from information stored at, a database. In response, the database management system retrieves and/or derives the requested information. Database management systems, and other applications that utilize a database, are often programmed to receive structured queries arranged according to Structured Query Language (SQL) or a similar syntax. SQL and similar syntaxes, however, are complex and often require detailed knowledge of the underlying database schema.

BRIEF DESCRIPTION OF DRAWINGS

The present disclosure is illustrated by way of example and not limitation in the following figures.

DETAILED DESCRIPTION

Figure 1:
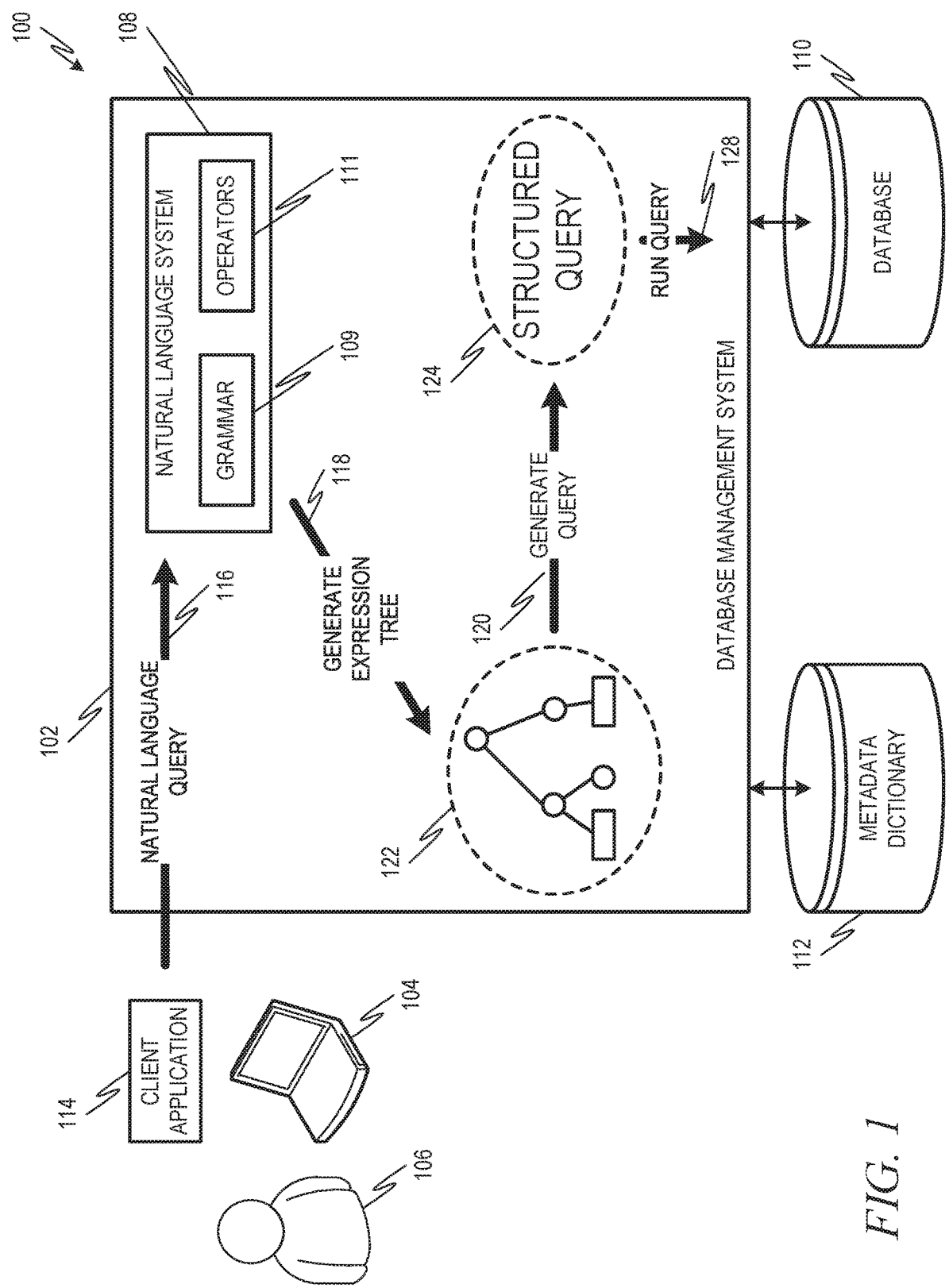
FIG. 1 is a diagram showing one example of an environment for converting natural language queries to structured queries.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to a natural language system. The natural language system may be programmed to receive a natural language query and convert the natural language query to a corresponding structured query for execution at a database or other data store. The natural language system may be incorporated, for example, into a database management system, and/or into a client application, such as a business intelligence client application, that utilizes a database or other suitable data store. The natural language system, as described herein, may improve the operation of the client applications, database management system, or other suitable computing system, for example, by enabling casual users to utilize complex structured queries without an intimate familiarity with the database schema and/or the specific structured query syntax utilized by the database management system.

In various examples, the natural language system may utilize an expression tree structure or expression tree to convert natural language queries to structured queries. The natural language system may identify operators and operands included in the natural language query. Operators may be functions or operations that may be performed on data. Operands may describe data that may be acted upon by an operator. For illustration purposes, in the statement "losses greater than $1M," the phrase "greater than" is an operator that acts on two operands, "losses" and "$1M." The natural language system may identify operators and operands and relate identified operands and operators to columns of tables included at the database, for example, using a metadata dictionary.

The operators and operands may be utilized to generate the expression tree, which may include a plurality of interconnected nodes including function nodes and argument nodes. Function nodes may correspond to specific functions or queries supported by the relevant structured query syntax (e.g., structured query language (SQL) or another suitable syntax). Argument nodes may depend from function nodes and may indicate an argument for the parent function node. In some examples, there may be a one-to-one, one-to-many, or many-to-one relationship between operators and function nodes. For example, the operator "greater than" from the example above may be incorporated into a single function node having two dependent argument nodes, one corresponding to the operand "losses" and another corresponding to the operand "$1M." As another example, consider the statement "region with the highest losses." This statement includes an operator "highest" along with operands "region" and "losses." In this case, as described in more detail below, the operator "highest" may be incorporated into the expression tree as two function nodes. A first function node may correspond to a sort function which sorts allowable values for the operand "region" by the operand "losses." A second function node may correspond to a limit function that returns the highest value from the list generated by the sort function. Similarly, operands may have one-to-one, one-to-many, or many-to-one relationships with argument nodes.

The expression tree may be utilized to generate a structured query. For example, the natural language system may traverse the expression tree from a root node. Function nodes may be used to generate corresponding function calls, with argument nodes indicating the argument or arguments for the function calls. If a function node depends from another function node, it may be represented in the structured query as an embedded or nested function. Structured queries generated by the natural language system may be executed at a database, for example, by a database management system. Results of the queries may be returned to the original user.

FIG. 1 is a diagram showing one example of an environment 100 for converting natural language queries to structured queries. The environment 100 comprises a database management system 102 including a natural language system 108. The database management system 102 manages a database 110 that may be organized according to a schema that describes various tables at the database including, for example, columns of the tables and relationships between the tables. The database management system 102 may be or include any suitable computing device or combination of computing devices. For example, the database management system 102 may be or include one or more servers.

The natural language system 108 may include a grammar module 109 and an operator module 111 that may be used to identify operators and operands from a natural language query. The grammar module 109 may store or access terms and relationships between terms that that may be part of natural language queries. The operator module 111 may store or access operators and/or operands that may be part of a natural language query. In some examples, the operator module 111 may also describe functions and/or arguments that correspond to particular operators and/or operands. To illustrate, consider an example natural language query including the terms "sales not greater than 1000." The grammar module 109 may store data indicating that the terms "greater" and "than" operate together to form the operator "greater than." The grammar module 109 may also store data indicating that the term "not," positioned as indicated, alters the operator "greater than," for example, by inverting it. The operator module 111, in this example, may include a mathematical definition of the operator "greater than" and may indicate expected operands.

In the example of FIG. 1, the database management system 102 (e.g., the natural language system 108, thereof) is also in communication with a metadata dictionary 112. The metadata dictionary 112 may be used to relate operators and operands from the natural language query 116 to specific columns and/or record fields in the database 110. For example, the metadata dictionary 112 may include column/record field names from the database 110. In some examples, the metadata dictionary may also store unique values for some or all of the columns of the database 110. The natural language system 108 may utilize the metadata dictionary 112 to relate operands and operators from natural language queries to specific columns at the database 110. In the example of FIG. 1, the metadata dictionary 112 is shown separate from the database 110. In some examples, the metadata dictionary 112 may be wholly or partially implemented at the database 110. For example, the metadata dictionary 112 may be implemented as one or more tables at the database 110.

In the example of FIG. 1, the database management system 102 is in communication with a client application 114 executing at a client computing device 104 of a user 106. The client computing device 104 may be or include any suitable computing device or combination of computing devices. For example, the client computing device 104 may be or include any suitable type of server, laptop computer, desktop computer, tablet computer, mobile computer, etc. The client application 114 may perform one or more functions utilizing data from the database 110. In some examples, the client application 114 may provide one or more business intelligence operations, such as for example, customer relationship management, supply chain management, etc.

The user 106 may provide a natural language query 116, for example, via an input device in communication with the client computing device 104. The natural language query 116 may include a set of ordered terms. A term may comprise one or more strings comprising alphanumeric characters and/or symbols. The natural language query 116 may be provided to the natural language system 108.

The natural language system 108 may generate an expression tree 122 from the natural language query 116. To generate the expression tree 122, the natural language system 108 may classify the terms of the natural language query 116 to identify operators and operands, for example, by comparing terms from the natural language query 116 to terms described by the metadata dictionary 112 and/or operators module 111. In some examples, the natural language system 108 may utilize the metadata dictionary 112 to relate operators and/or operands identified in the natural language query 116 to specific columns at the database 110.

The natural language system 108 (e.g., the grammar and/or operators modules 109, 11 thereof) may comprise one or more lists of terms that may be part of a natural language query, such as the natural language query 116. Each term may be associated with a particular operand or operator. The natural language system 108 may also indicate operand types for different operands. For example, an operand may be a measure, a dimension, a dimension value, a cardinal value, etc. A measure may describe a value that can be acted upon by an operator. Example measures include profit, loss, revenue, expenses, sales, etc. A dimension may describe a subcategory or division that describes or provides context to a measure. Examine dimensions include geographic areas, business divisions, time periods, etc. For example, a measure may be provided for one or more geographic areas, for one or more business divisions, for one or more time periods, etc. A dimension value may describe a specific value for a dimension. For example, a time period dimension could have dimension values that include, the third quarter of 2016, last week, the past ten years, etc.

In some examples, using the metadata dictionary 112, the grammar module 109, and/or the operators module 111, the natural language system 108 may classify terms from the natural language query 116 as operators, operands, or other language. Other language terms may include terms that are not indicated by the grammar module 109 or operators module 111 as being either operands or operators. In some examples, other language terms may also include terms that, although they can be classified as operators or operands by the natural language system 108, do not match any columns of the database 110 as indicated in the metadata dictionary 112. In some examples, other language terms may not be translated to the expression tree 122.

The natural language system 108 may incorporate the operators and operands identified from the natural language query into interconnected nodes of the expression tree 122 at operation 118. For example, operators may be expressed as subtrees including one or more function nodes and (optionally) one or more argument nodes. Additional examples of the operation 118 are described herein at FIGS. 2 and 3. The expression tree 122 (and various other expression trees described herein) are shown in a two-dimensional chart form. It will be appreciated that the expression tree 122 may be represented in physical memory in any suitable form that expresses the nodes of the expression tree and the dependencies between the nodes, as described herein.

At operation 120, the natural language system 108 may generate a structured query 124 from the expression tree 122. For example, the natural language system 108 may traverse the expression tree from a root node of the expression tree. The root node may be a function node. The natural language system 108 may add to the structured query a function call corresponding to the function indicated by the root node with arguments determined by the node or nodes that depend from the operator node. If a second function node depends from the root node, then the natural language system 108 incorporate a function call for the second function node into the function call for the root node, for example, as a nested or embedded function call. (For example, the second function call, or a result thereof, may be an operand of the first function call.) This process may continue, in some examples, until all nodes of the expression tree 122 are added to the structured query 124, for example, as function calls or arguments of function calls. At operation 128, the database management system may run the structured query 124 at the database 110. A result or results of the structure query 124 may be returned to the user 106, for example, via the client application 114 and client computing device 104.

FIG. 1 shows just one example of the environment 100. Various modifications are possible. In some examples, as shown, the natural language system 108 may be a component of the database management system 102. For example, the natural language system 108 may be or include a hardware component associated with the database management system 102 and/or a software component executed as a part and/or in communication with the database management system 102. In some examples, the natural language system 108 may be similarly associated with the client application 114 in addition to or instead of the database management system as shown. Also, in some examples, the metadata dictionary 112 may be stored at the client computing device 104 and/or at another location accessible to the client application 114.

Figure 2:
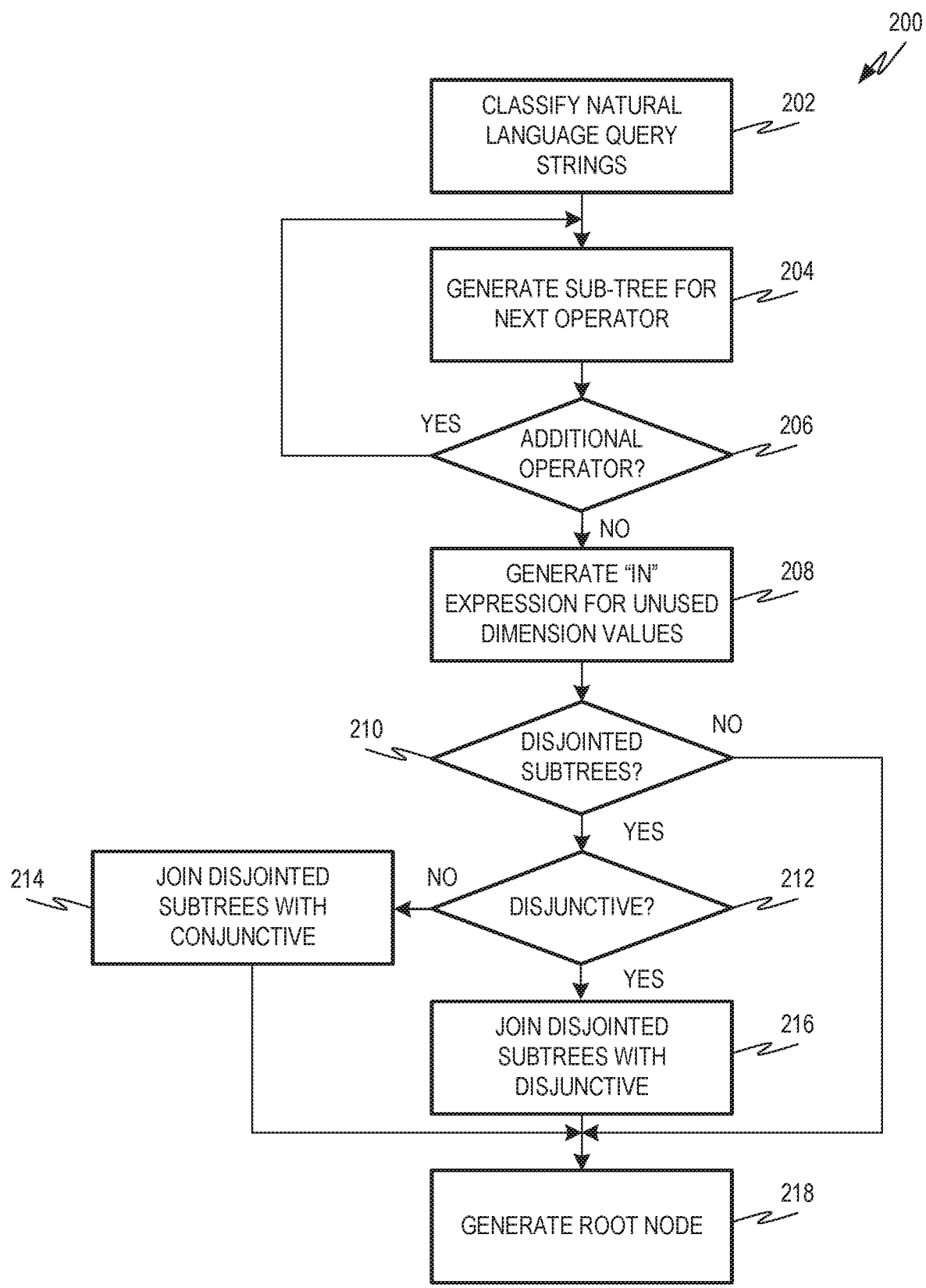
FIG. 2 is a flowchart showing one example of a process flow that may be executed by the natural language system of the environment of FIG. 1 to convert a natural language query to a structured query.

FIG. 2 is a flowchart showing one example of a process flow 200 that may be executed by the natural language system 108 to convert a natural language query 116 to a structured query 124. As described herein, the natural language query 116 may include a set of ordered terms. At operation 202, the natural language system 108 may classify the terms of the natural language query 116, for example, as operators, operands, or other language terms. Operators may be added to a list of operators for the natural language query 116 (e.g., an operator list). In some examples, the operators module 111 of the natural language system 108 may be utilized to identify operators and operands. In some examples, classifying the terms of the natural language query 116 may also include comparing operand and/or operators to the metadata library 112 to determine if the operands and/or operators correspond to columns of tables included in the database 110. For example, if an operand does not correspond to a column at the database, it may be classified as other language.

In some examples, operands may be further classified, for example, as measures, dimensions, dimension values, cardinal values, etc. In some examples, classifying the terms may include generating one or more lists of like terms that may be used to generate the expression tree 122. For example, operators may be added to an operator list in the order that the operators appear in the natural language query. Also, when a dimension operands is encountered, the dimension operand may be added to a projection operand list and a groupby operand list. A measure may be added to the projection operand list. When a dimension value is encountered, the natural language system may increment a dimension values remaining counter and add the dimension value to the groupby operand list. If there are additional dimension values for the same dimension, then the dimension value may also be added to the projection operand lists. The operator list may be used, for example, at operation 206, to determine if additional operators remain. The projection operand list and groupby operand list may be used, for example, at operation 218 to determine the root node. The dimension values remaining counter may be used at operation 208 to determine if additional dimension values remain after all operators are added to the expression tree 122.

At operation 204, the natural language system 108 may generate a subtree for the first operator in the operator list. A subtree may include, for example, one or more function nodes and one or more argument nodes that depend from a function node. Additional detailed examples for generating a subtree for an operator are described herein with respect to FIG. 3. At operation 206, the natural language system 108 may determine if there are additional operators in the operator list. If so, the natural language system 108 may generate an additional subtree for the next operator in the operator list at operation 204. The additional subtree may depend from the function node of the last operator considered.

If no additional operators remain in the operator list at operation 206, the natural language system 108 may, at operation 208, generate an "in" subtree for dimension value operands from the natural language query that have not yet been considered, if any. For example, the natural language system 108 may generate a function node for an "in" function with an argument node depending therefrom for the dimension value operand, which may be a remaining operand. (For example, if the remaining dimension value is "the third quarter of 2016," then the natural language system may and the function node "in" with an argument node "the third quarter of 2016.")

At operation 210, the natural language system 108 may determine if any of the subtrees generated at operation 204 are disjointed. Disjointed subtree may occur, for example, when the natural language query 116 included multiple operators joined by terms that correspond to conjunctions in the language of the natural language query 116, such as "and" or "or." If disjointed subtrees exist, the natural language system 108 may, at operation 212, determine if there is an indication of a disjunctive term in the natural language query 116. In some examples, conjunction terms may be classified as other language terms at operation 202, so the natural language system 108 may examine the other language terms at operation 212 to determine if there is an indication of a disjunctive term.

If one or more disjunctive terms are found at operation 212, then the natural language system 108 may, at operation 216, join the disjointed subtrees with a function node corresponding to disjunctive function (e.g., "or"). If no disjunctive terms are found at operation 212, then the natural language system 108 may, at operation 214, join the disjointed subtrees with a function node corresponding to a conjunctive function (e.g., "and"). At operation 218, the process flow 200 may generate a root node for the expression tree 122. For example, the root node may be a function node indicating a projection of all of the projection operands of the natural language query grouped by groupby operands with additional operators, such as filter, sort and limit, determined by the operators in the natural language query 116.

Figure 3:
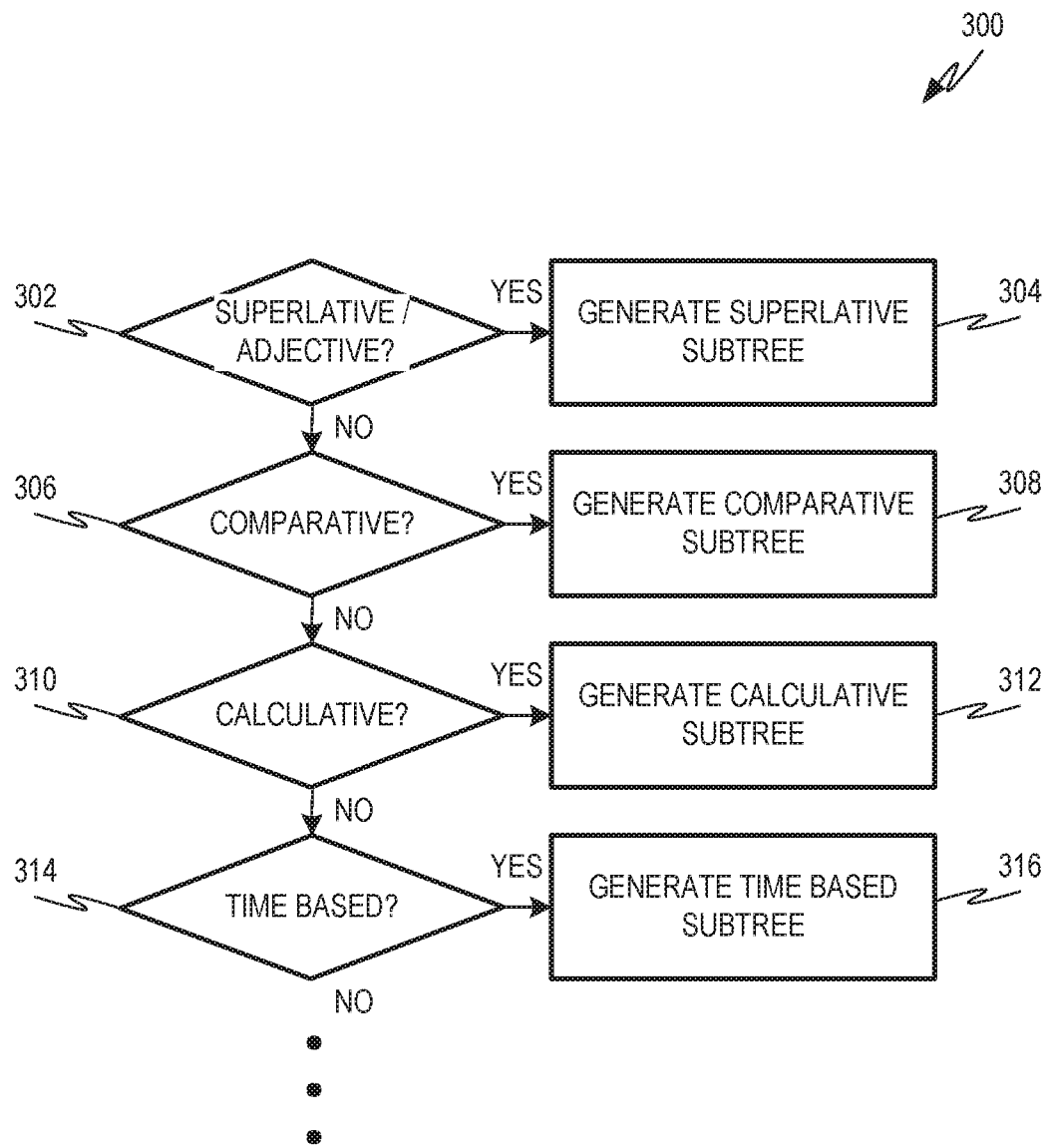
FIG. 3 is a flowchart showing one example of a process flow for generating a subtree for an operator.

Referring again to operation 204, in some examples, different types of operators may utilize different numbers and types of operands in different ways. For example, FIG. 3 is a flowchart showing one example of a process flow 300 for generating a subtree for an operator, for example, as described above at operation 204. At operation 302, the natural language system 108 may determine if the operator is a superlative or adjective operator. A superlative operators may be an operator that returns the single highest or lowest measure value, for example, in a particular dimension value. Examples of superlative operators include, least, lowest, most, highest, etc. An adjective operator may be an operator that returns a set of the highest or lowest measure values. Examples of adjective operators include low, high, top, bottom, etc.

If the considered operator is a superlative or adjective operator, then the natural language system may generate a superlative/adjective subtree at operation 304. For example, the natural language system 108 may identify operands in the natural language query 116 and generate function and argument nodes for the expression tree based on the operands. For example, the natural language system 108 may identify measure, dimension, and cardinal value operands (if any) in the natural language query 116.

Based at least in part on the identified operands, the natural language system 108 may generate a superlative/adjective subtree including two function nodes, a sort function node a limit node. The sort node may have two dependent argument nodes, a measure argument node corresponding to the identified measure and a dimension argument node corresponding to the identified dimension. Together, the sort function node and the measure and dimension argument nodes may indicate a function that returns a set of dimension values for the dimension sorted by their corresponding values for the measure. For example, if the superlative/or adjective operator requests the region with the highest expense, the sort function node may have a dependent argument node for the dimension "region" and another dependent argument node for the measure "expenses." This may indicate a sort of regions by expense.

The second function node for a superlative/adjective subtree may be a limit function node with an argument node indicating a number of dimension values to be returned from the set of dimension values of the sort function. In some examples, when the natural language query includes a cardinal value (e.g., numerical value), the argument node may correspond to the cardinal value. (E.g., the seven highest losses, the top five regions by profit, etc.) In other examples, where no cardinal value is present, the argument node may have a value determined by the type of the operator. For example, for a superlative operator, the argument node may correspond to the argument "1," returning the most extreme dimension value from the set of dimension values generated by the sort. For an adjective operator, the argument node may correspond to an arbitrary number (e.g., 5, 10, etc.). For example, if the natural language query requests regions with profits that are high, the natural language system may default to returning any suitable number of the highest profit regions.

If the operator is not a superlative or adjective operator at operation 302, the natural language system 108 may determine, at operation 306, whether the operator is a comparative operator. A comparative operator may be an operator that calls for a comparison between two operands. Example comparison operators include greater, higher, more, lesser, lower, less, above, below, equal to, etc.

If the operator is a comparative operator, than the natural language system 108 may generate a comparative subtree at operation 308. For example, the natural language system 108 may identify operands in the natural language query 116 including, for example, dimension operands, measure operands, dimension value operands, cardinal value operands, if any. In some examples, the natural language system 108 may also identify a calculated measure, also, if any.

A calculated measure may represent an embedded operator that is handled through the comparative operator and not treated separately. For example, consider the natural language query "regional sales greater than average." The operator "average" may be treated as separate operator and considered separately at operation 204, or may be considered a calculated measure of the comparative operator "greater than."

The comparative subtree generated at operation 306 may include different function and/or argument nodes depending on the operands in the natural language query. For example, if the identified operands include one dimension value, more than one measure, and no calculated values, then the comparative subtree may include a greater than or equal to (GTEQ)/less than or equal to (LTEQ) function node, result function node, and in function node for each measure. The function node may have a dependent argument node indicating the dimension value from the natural language query 116. The result function node may be a parent of the in function node may indicate a result of the projection of the measure grouped by the dimension corresponding to the dimension value. The GTEQ/LTEQ function node may indicate either a greater than or equal to function or a less than or equal function, depending on the operator. The GTEQ/LTEQ node may be a parent of the result function node and of an argument node indicating the measure.

If the identified operands include one dimension, more than one measure, and one of the measures is a cardinal value (e.g., a number), then the comparison subtree may include a comparison function node with a child argument node corresponding to the non-cardinal measure and a child argument node corresponding to the cardinal value. The comparison function node may correspond to the comparison indicated by the operator (e.g., greater, higher, above, etc. may correspond to a greater than or greater than or equal to function; lesser, lower, below may correspond to a less than or less than or equal to function, etc.)

If the identified operands include one dimension, one measure, and a calculated measure, then the comparison subtree may include a comparison function with a dependent argument node corresponding to the measure and another dependent function node corresponding to the subtree of the function used to determine the calculated measure.

If the operator is not a comparative operand at operation 306, then the natural language system 108 may determine, at operation 310, if the operator is a calculative operator. A calculative operator may be an operator that acts on a set of values to return a single quantity describing the set. Example calculative operators include average or mean, median, etc. If the operator is calculative, the natural language system 108 may generate the calculative subtree at operation 312. The natural language system 108 may determine a dimension and a measure from the operands of the natural language query 116, which may be the measure nearest to the operator in the natural language query 116 and the dimension nearest to operator in the natural language query 116.

The calculative subtree may include a calculative function node corresponding to the operator and a result function node depending from the calculative function node. The result node may indicate a projection of the dimension grouped by the dimension and the measure.

If the operator is not a calculative operator at operation 310, then the natural language system may determine if the operator is a time-based operator at operation 314. Time-based operators may include operators that return results for a specific time period (e.g., from, up to, since, until, etc.). If the operator is a time-based operator, then the natural language system 108 may generate a time-based subtree at operation 316. For example, the natural language system 108 may identify a dimension and a dimension value from the natural language query 116 (e.g., the dimension and dimension value nearest to the operator). A time-based subtree may include a time function node corresponding to the operator with an argument node corresponding to the dimension value.

An example algorithm implementing one example of the process flow 200, 300 is provided below in pseudocode. The algorithm provided below includes several specific customizations of the process flows 200, 300. For example, in the algorithm reproduced below, the only calculated measure is an average. Likewise, the only calculative operator is average.

```
terms ← buildTerms(queryText) // classifies every word as
operator, operand, or other language
semanticGraph ← createGraph(terms) //create a semantic graph
using these terms
for each term in terms
    if operator then operatorList.add(term)
    if dimension then projectionOperands.add(term);
groupByOperands.add(term);
    if measure then projectionOperands.add(term)
    if dimensionValue then
        dimensionValuesRemaining.put(dimensionValueAttribute,
[term])
        groupByOperands.add(dimensionValueAttribute)
    if there are more dimensionValues corresponding to same
dimension then
        projectionOperands.add(term)
for each operator in operatorList do
    case: superlative (LEAST, LOWEST, HIGHEST)
    case : adjective(LOW,HIGH,TOP,BOTTOM)
        measure ← semanticGraph.getNearestMeasure( )
        dimension ← semanticGraph.getNearestDimension( )
        cardinalValue ← semanticGraph.getNearestValue // OR
default to 1(superlative) or 5(adjective)
        create operator SORT(measure,dimension)
        create operator LIMIT(cardinalValue)
    case: comparative (GREATER, HIGHER, MORE, LESSER, LOWER, LESS,
ABOVE, BELOW)
        dimensions ← semanticGraph.getNearestDimensions( )
        measures ← semanticGraph.getNearestMeasures( )
        dimensionValues ←
semanticGraph.getNearestDimensionValues( )
        cardinalValue ← semanticGraph.getNearestCardinalValue( )
        calculatedMeasure ←
semanticGraph.getNearestCalculatedMeasure( )
        if dimensions.count = 1 and measures.count = 1 and
calculatedMeasure.isPresent then
            create operator
COMPARISON(measures[0],operator(AVERAGE,RESULT(PROJECTION (dimensi
ons[0],measures[0]),GROUPBY(dimensions[0]))))
        if dimensionValues.count = 1 and measures.count >= 1 then
            create operator IN(dimensionValue)
            for each measure in measures do
            create operator
RESULT(PROJECTION(measure),GROUPBY(dimensionValues[0].attribute),
GTEQ/LTEQ(dimensionValues[0]))
        if dimensions.count = 1 and measures.count >=1 and
cardinalValue.isPresent then
            create operator COMPARISON(measures[0],cardinalValue)
    case: average (AVERAGE)
        dimension ← semanticGraph.getNearestDimension( )
        measure ← semanticGraph.getNearestMeasure( )
        create operator
AVERAGE(RESULT(PROJECTION(DIMENSION),GROUPBY(dimension,measure)))
    case: time (FROM,UPTO,SINCE,TILL)
        dimension ← semanticGraph.getNearestDimension( )
        dimensionValue ← semanticGraph.getNearestDimensionValue( )
        create operator TIME(dimensionValue)
        dimensionValuesRemaining.remove(dimensionValue)
if dimensionValuesRemaining.count > 1 then
    create operator IN
for each value in dimensionValuesRemaining do
    IN.addOperand(value)
create operator RESULT (PROJECTION (projectionOperands),GROUPBY
(groupByOperands), FILTER(IN), SORT, LIMIT)
```

Figure 4:
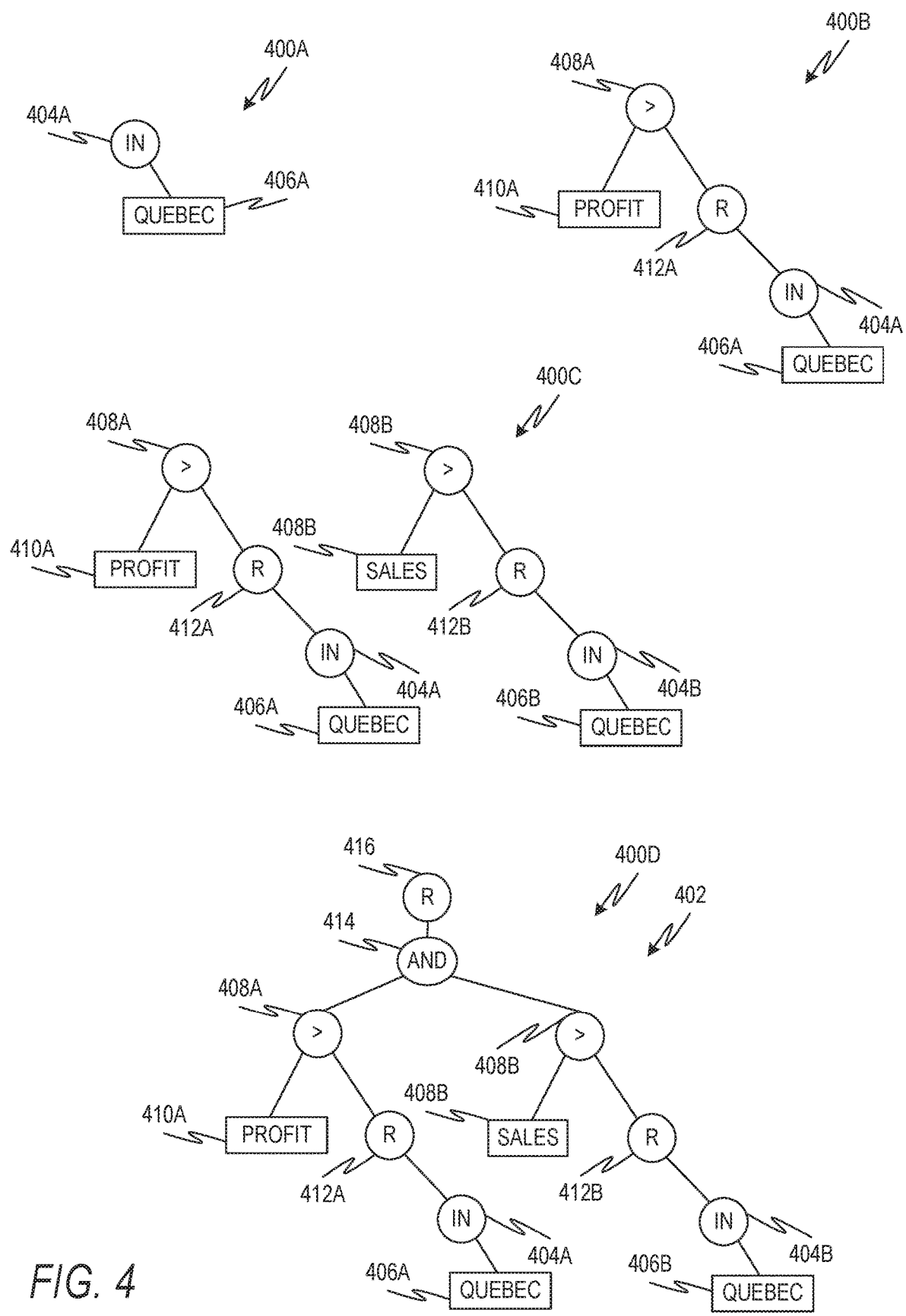
FIG. 4 is a diagram showing iterations of the creation of an expression tree from an example natural language query.

FIG. 4 is a diagram showing iterations 400A, 400B, 400C, 400D of the creation of an expression tree 402 (shown at final iteration 400D) from an example natural language query "profit and sales greater than Quebec." The expression tree 402 in the example of FIG. 4 is generated according to the process flows 200, 300 and the pseudocode algorithm reproduced above. For example, referring to the process flow 200, the natural language system 108 may classify the terms of the example natural language query (operation 202). An example classification for the example natural language query is provided by TABLE 1 below:

TABLE 1

| Term | Classification |
| --- | --- |
| profit | operand/measure |
| and | other language |
| sales | operand/measure |
| greater than | operator |
| Quebec | operand/dimension value |

In some examples, as described herein, classifying the terms of the example natural language query may also include generating an operator list, a projection operand list, a groupby operand list, and a dimension values remaining counter. For example, the measures "profit" and "sales" may be added to the projection operand list. The operator "greater than" may be added to the operator list. The presence of the dimension value "Quebec" may cause the projection value counter to be incremented. Also, the dimension associated with Quebec (e.g., "region") may be added to the groupby operand list. Because no additional values for the dimension "geographic area" are included in the example natural language query, then the dimension value "Quebec" may not be added to the projection operand list.

Referring to operation 204, the natural language system 108 may generate a subtree for the operator "greater than." Referring to the process flow 300, at operation 306, the natural language system 108 may determine that the operator "greater than" is a comparative operator. Further, the natural language system 108 may determine that the measures for the operator are "profits" and "sales," that the nearest dimension value is "Quebec" and that there are no cardinal values or calculated measures in the example natural language request.

Accordingly, the natural language system 108 may execute the case where the number of dimension values is equal to one and the number of measures is greater than or equal to one. For example, referring to iteration 400A, the natural language system 108 may generate an in function node 404A and an argument mode 406A for the dimension value "Quebec" that depends from the in function node 404A. The natural language system 108 may generate a greater than function node 408A for the first measure, "profit." From left to right, an argument node 410A for "profit" and the result function node 412A may depend from the greater than function node 408A. The result function node 412A may indicate a result of the projection of the first measure. "profit" grouped by the dimension corresponding to the dimension value "Quebec," which is "region." The in function node 404A and argument node 406A may depend from the result node 412A.

For the second measure, "sales," the natural language system 108 may generate a second greater than function node 408B. From left to right, an argument node 410B for "sales" and a result function node 412B may depend from the greater than function node 408B. The result function node 412B may indicate a result of the projection of the second measure, "sales" grouped by region (e.g., the dimension corresponding to the dimension value, "Quebec"). An in function node 404B and argument node 406B with the dimension value "Quebec" similar to the nodes 404A and 406B.

Referring back to the process flow 200, there may be no additional operators at operation 206, and no unused dimension values at operation 208. At operation 210, the natural language system 108 may determine that there are disjointed subtrees. That is, the subtree with a root at node 408A and the subtree with a root at node 408B. The natural language system 108 may determine that the example natural language query included no indication of a disjunctive (operation 212), so it may join the disjointed trees with a conjunctive function node 414 (operation 214). The root node 416 may be a function node indicating the projection of the projection operands, "profit" and "sales," grouped by the groupby operand "region."

Figure 5:
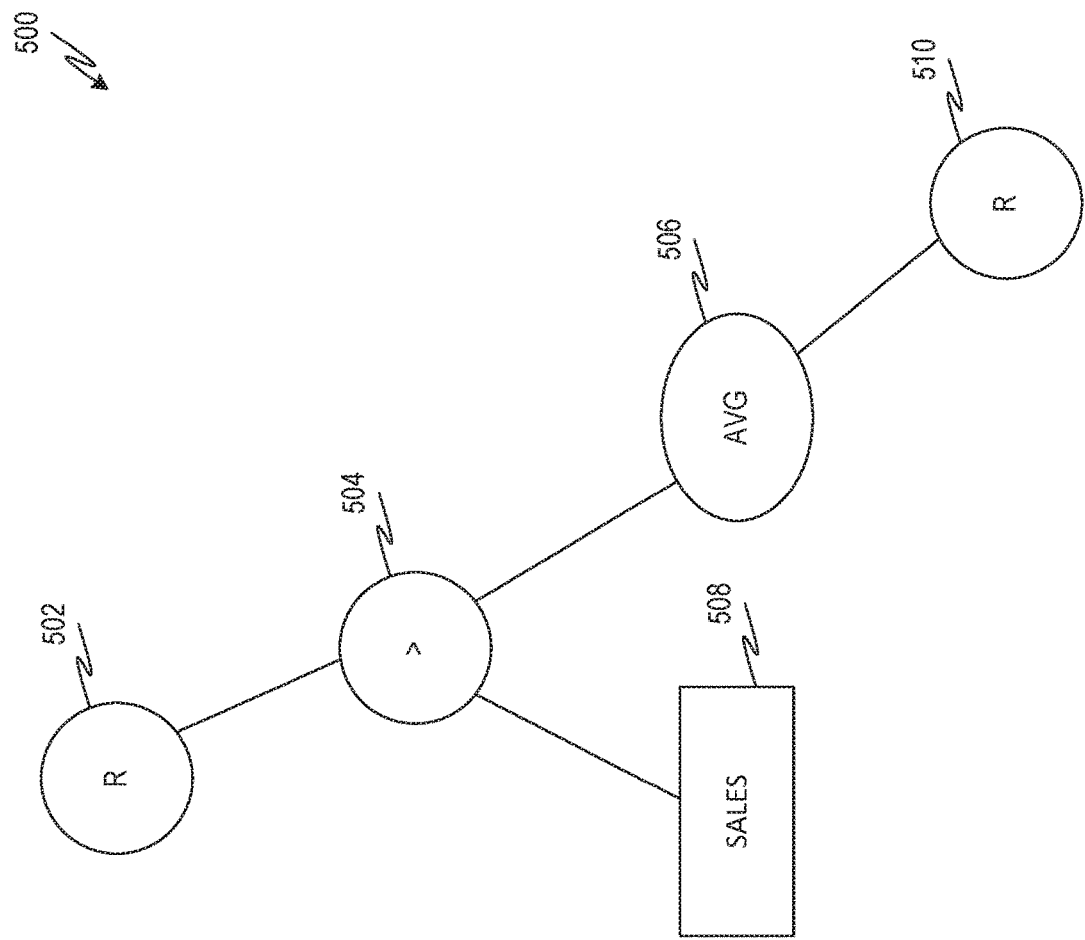
FIG. 5 is a diagram showing one example of an expression tree that may be generated from another example natural language query.

FIG. 5 is a diagram showing one example of an expression tree 500 that may be generated from another example natural language query, "product sales above average." The expression tree 500 may be generated by the natural language system 108 according to the process flows 200, 300, and the pseudocode algorithm reproduced above. For example, referring to the process flow 200, the natural language system 108 may classify the terms of the example natural language query (operation 202). An example classification for the example natural language query of FIG. 5 is provided by TABLE 2 below:

TABLE 2

| Term | Classification |
| --- | --- |
| product | operand/dimension |
| sales | operand/measure |
| above | operator |
| average | operator |

In the example of TABLE 2, the term "average" is listed as a calculated measure although, in some examples, the term "average" may also be classified as an operator.

In some examples, as described herein, classifying the terms of the example natural language query may also include generating an operator list, a projection operand list, a groupby operand list, and a dimension values remaining counter. For example, the dimension operand "product" may be added to the projection operand list and the groupby operand list. The measure "sales" may be added to the projection operator list. (In some examples, calculated measures may be omitted from the projection operator list.) The operator "average" may be added to the operator list.

At operation 204, the natural language system 108 may generate a comparative subtree for the word "above" mapped to the operator "greater than." For example, the natural language system 108 may determine the nearest dimensions to "above" (e.g., "product") and the nearest measures to average (e.g., "sales" and "average"). The natural language system 108 may proceed to the case where the dimension count is one, the measures count is one, and a calculated measure is present. For example, the natural language system 108 may generate a function node 506 corresponding to the operator "average" and a projection node 510 indicating the projection of the dimension (e.g., "product"). An argument node 508 may correspond to the operand "sales" and may indicate that the projection grouped by the dimension (e.g., "product") and the measure ("sales"). The average function node 506 may depend from a greater than function node 504. A sales argument mode 508 may depend from the greater than function node to the left of the average function node 506. At operation 218, the natural language system may generate the root node 502, which may be a function node indicating a projection of the dimension "product" and the measure "sales" grouped by "sales."

Figure 6:
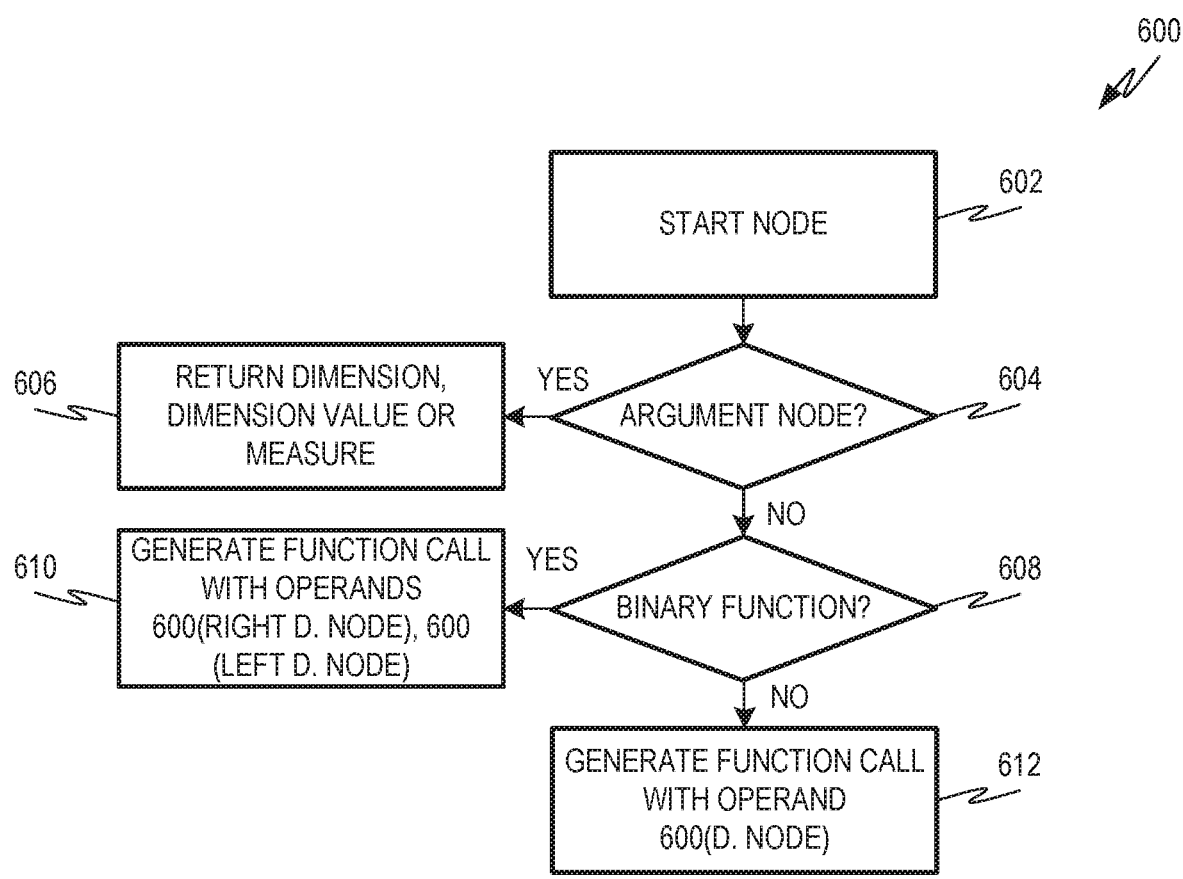
FIG. 6 is a flowchart showing one example of a process flow that may be executed by the natural language system of the environment of FIG. 1 to generate a structured query from an expression tree.

FIG. 6 is a flowchart showing one example of a process flow 600 that may be executed by the natural language system 108 to generate a structured query from an expression tree. In some examples, the process flow 600 may be referred to as a query generation function. The process flow 600, as described, may be executed recursively. For example, the process flow 600 may execute itself at various positions as described. In some examples, the process flow 600 may be configured and executed in linear non-regressive manner, however. Also, although the process flow 600 is described herein as be performed on the example expression tree 122, it may be performed on any suitable expression tree generated according to the process flows 200, or 300, or the example pseudocode for generating an expression tree provided herein.

At operation 602, the process flow 600 may begin at a current node. Initially, the current node may be the root node of the expression tree 122. For subsequent calls of the process flow 600, the current node may be at other positions in the expression tree 122, for example, as indicated. At operation 604, the natural language system 108 may determine if the current node is an argument node. If so, at operation 606, the process flow 600 may return the argument associated with the current node, which may be, for example, a dimension, a dimension value, a measure, etc. After returning the argument, the process flow 600 may end.

If at operation 604, the natural language system 108 determines that the current node is not a binary node, then the current node may be a function node. At operation 608, the natural language system 108 may determine if the current node is a binary function node (e.g., a function node comprising two dependent nodes). If no, then the current node may be a function node with a single dependent node. At operation 612, the natural language system 108 may, at operation 610, generate a function call for the function of the function node. The function call may be according to the syntax of the structured query. To determine an operand for the function call, the natural language system 108 may recursively call the process flow 600, indicating the single dependent node of the previous current node as the new current node.

If the natural language system 108 determines, at operation 608, that the current node is a binary function node, then it may, at operation 610, generate a function call in the syntax of the structure query. Operands for the function call may be determined by recursively calling the process flow 600 twice, once with the left dependent node of the current node as the new current node and a second time with the right dependent node of the current node as the new current node.

An example algorithm implementing one example of the process flow 600 is provided below in pseudocode. The algorithm provided below includes several specific customizations of the process flow 600. For example, the pseudocode below describes a function called buildQuery, which takes as an argument an identification of a current node, called current Node. The function called buildQuery is one example of how the process flow 600 may be implemented. The algorithm below also describes argument nodes that include cardinal values (e.g., numbers). For example, when the current node is an argument node corresponding to a cardinal value, the natural language system 108 may return the cardinal value.

Also, the below also includes slightly different treatments for different types of function nodes. For example, function nodes that correspond directly to operators from the natural language query are handled similar to the way described with respect to the process flow 600. Additional function node functions, such as ASC (in ascending order), DESC (in descending order), EQ (equal to), and IN (in a dimension value) are treated slightly differently, for example, to consider aspects of these specific functions. It will be appreciated that, in various examples, other specific implementations of the process flow 600 may include similar deviations, for example, to account for differences in the syntax of the structured query.

```
buildQuery(currentNode)
if currentNode = argumentNode then
    if currentNode.type = MEASURE or DIMENSION then return
"argument"
    else if currentNode.type = DIMENSION_VALUE then return
"dimensionValue"
    else if currentNode.type = CARDINAL then return value
//NOTE: without quotes
    else return " value "
else if function =AND or GT or LT or GTE or LTE then
    if arguments.count == 2 then
        queryString = arqument1 + getFunction( ) + argument2
    else if argument.count == 1 then
        argument's dimension + getFunction( ) + argument
else if LIMIT then buildQuery(argument1)
else if function = ASC then buildQuery(argument1) + "ASC "
else if function = DESC then buildOuery(argument1) + "DESC
"
else if function = EQ then argument1 + "=" argument2
else if function = IN then dimensionName(argument1) +"IN" +
argument1 + "," + argument 2. . .
else if function = GROUPBY then buildQuery(argument1) +
buildQuery(argument2) + . . .
else if function = SELECT then
    for every argument do
        if type is measure then
            queryString = AGGREGATION_TYPE(MEASURE) AS
buildQuery( )
else if function = AVG then
    projectedDimension = buildQuery(projectionArgument1)
    queryString = (SELECT AVG(projectedDimension) AS
(projectedDimension) FROM buildQuery(argument1))
else if function = RESULT then
    projection = buildQuery(argument1)
    groupBy = buildQuery(argument2)
    for remaining arguments do
        if function = IN then add to filterClause
        else if function = GT or LT or GTE or LTE or EQ then
    add to WhereClause
        else if function = ASC or DESC then add to
orderByClause
        else if function = LIMIT then add to
explicitLimitCaluse
        queryString = SELECT * FROM
            (SELECT projection FROM "TABLE_NAME"
            WHERE filterClause
            GROUPBY groupByClause)
        whereClauseBuilder
        orderByClause
        explicitLimitClause
```

Referring now back to the expression tree 402 of FIG. 4, an example query derived according to an example application of the process flow 600 and the pseudocode example above is provided below:

```
SELECT * FROM(SELECT SUM(PROFIT" ) AS "PROFIT"
,SUM ("SALES") AS "SALES", "REGION" FROM "superStore" GROUP
BY "REGION" )WHERE "PROFIT" >= (SELECT SUM("PROFIT" ) AS
"PROFIT" FROM "superStore" WHERE "REGION" IN ('Quebec' )
GROUP BY "REGION" ) AND "SALES" >= (SELECT SUM("SALES")
AS "SALES" FROM "superStore" WHERE "REGION" IN ('Quebec')
GROUP BY "REGION")
```

Referring now back to the expression tree 500 of FIG. 5, an example query derived according to an example application of the process flow 600 and the pseudocode example above is provided below:

```
SELECT * FROM (SELECT "PRODUCT_NAME" ,SUM("SALES" ) AS
"SALES" FROM "_SYS_BIC"."Search/superStore" GROUP BY
"PRODUCT_NAME" ) WHERE "SALES" > (SELECT AVG ("SALES" )
AS "SALES" FROM (SELECT SUM ("SALES" ) AS "SALES" FROM
"_SYS_BIC"."Search/superStore" GROUP BY "PRODUCT_NAME"))
```

Figure 7:
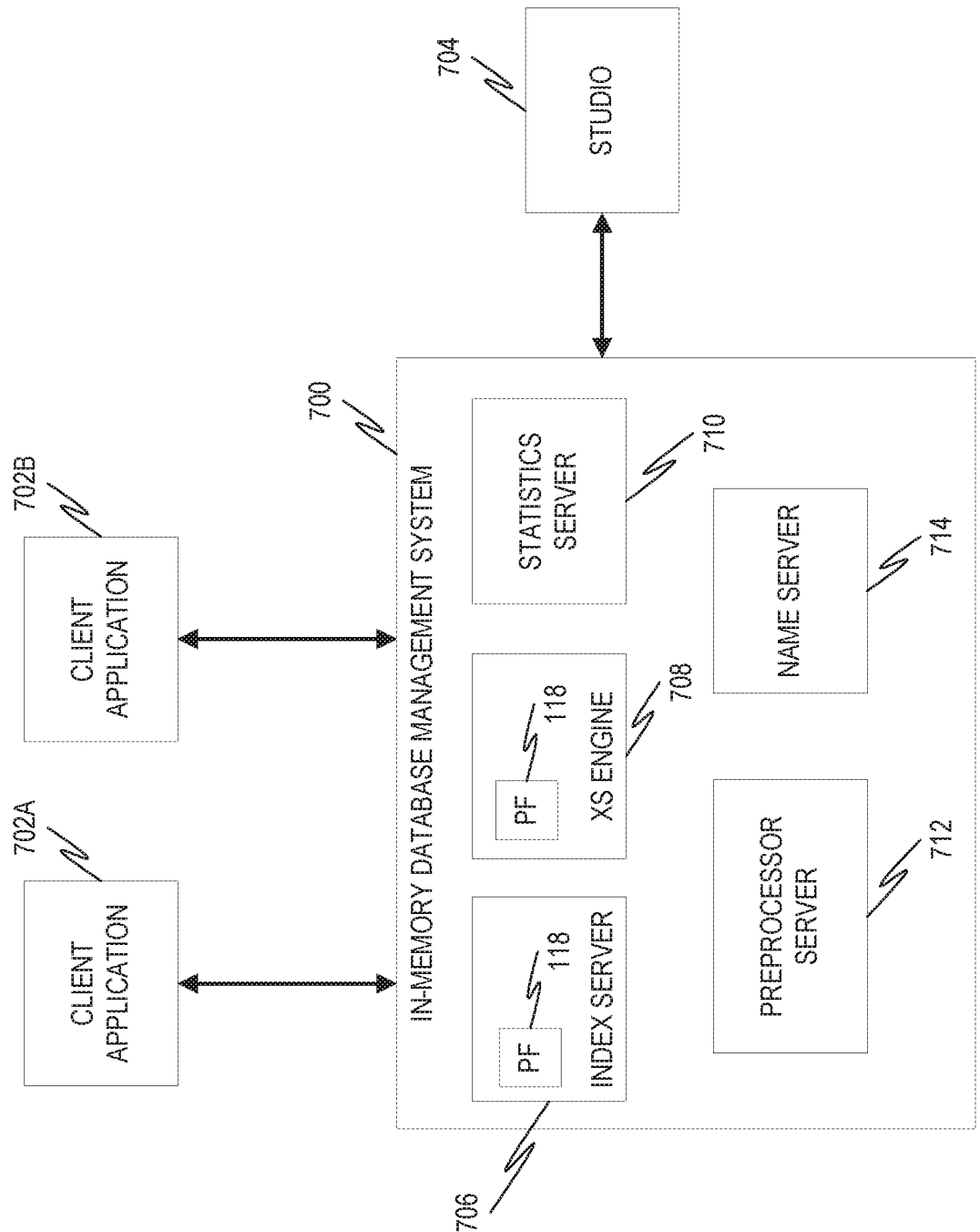
FIG. 7 is a diagram illustrating an example of an in-memory database management system that may be used to implement natural language query generation.

FIG. 7 is a diagram illustrating an example of an in-memory database management system 700 that may be used to implement natural language query generation, for example, as described herein. An in-memory database stores data primarily at main memory, such as a random access memory (RAM). This is different than databases that primarily employ a disk storage mechanism. In some examples, the database management system 700 may be or include an example of the HANA system from SAP AG of Walldorf, Germany. Although various features of table privilege management are described herein in the context of an in-memory database, table privilege management may be generally performed at any suitable database management system. For example, the database management system 102 of FIG. 1, in some examples, may be implemented in a manner similar to that of the database management system 700.

The in-memory database management system 700 may be coupled to one or more client applications 702A, 702B. Client applications 702A, 702B may perform operations similar to those of the client application 114 of FIG. 1. For example, the client applications 702A, 702B may perform one or more functions utilizing data from the database (e.g., database 110) including, for example, presenting a user interface (UI) to one or more users, etc. The client applications 702A, 702B may communicate with the in-memory database management system 700 through a number of different protocols, including Structured Query Language (SQL), Multidimensional Expressions (MDX), Hypertext Transfer Protocol (HTTP), Representational State Transfer (REST), Hypertext Markup Language (HTML). In some examples, client application 702A, 702B, similar to the client application 114, may communicate with the in-memory database utilizing natural language queries. For example, the database management system 700 and/or the client applications 702A. 702B may include or be in communication with a natural language system similar to the natural language system 108 described herein.

FIG. 7 also shows a studio 704 that may be used to perform modeling by accessing the in-memory database management system 700. In some examples, the studio 704 may allow complex analysis to be performed on data drawn not only from real time event data and windows, but also from stored database information.

The in-memory database management system 700 may comprise a number of different components, including an index server 706, an XS engine 708, a statistics server 710, a preprocessor server 712, and a name server 714. These components may operate on a single computing device, or may be spread among multiple computing devices (e.g., separate servers). The index server 706 contains the actual data and the engines for processing the data. It may also coordinate and uses the other servers.

The XS engine 708 allows clients to connect to the in-memory database management system 700 using web protocols, such as Hypertext Transfer Protocol (HTTP). Although the XS engine 708 is illustrated as a component of the in-memory database management system 700, in some examples, the XS engine may be implemented as one or more Application Program Interfaces (APIs) and/or services positioned between the client applications 702A. 702B and the in-memory database management system 700.

The statistics server 710 collects information about status, performance, and resource consumption from all the other server components. The statistics server 710 can be accessed from the studio 704 to obtain the status of various alert monitors.

The preprocessor server 712 is used for analyzing text data and extracting the information on which the text search capabilities are based.

The name server 714 holds information about the database topology. This is used in a distributed system with instances of the database on different hosts. The name server 714 knows where the components are running and which data is located on which server. In an example embodiment, a separate enqueue server may operate in the manner described above with respect to enqueue servers, specifically with regard to creating and managing light-weight enqueue sessions.

Figure 8:
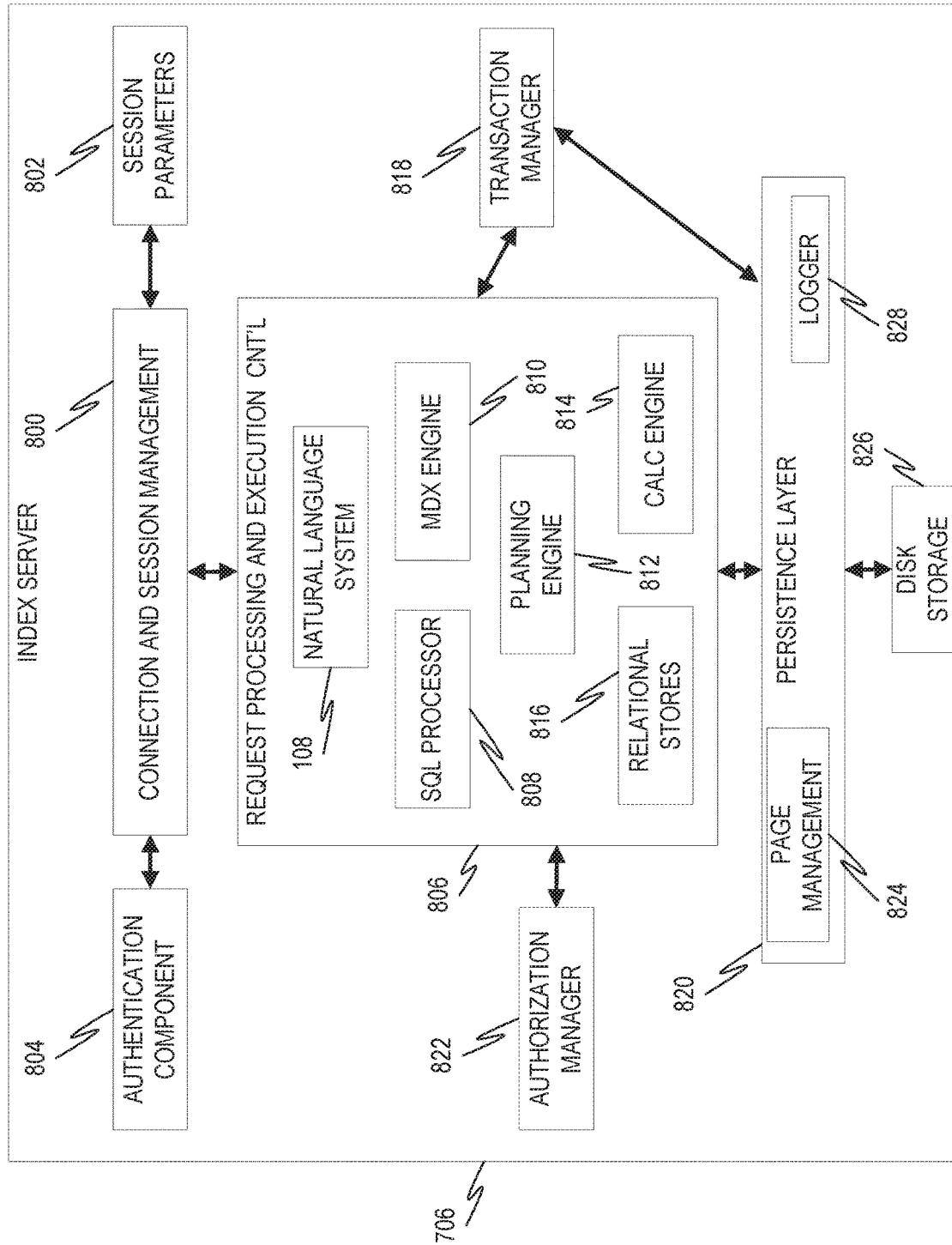
FIG. 8 is a diagram illustrating an example of the index server of FIG. 7.

FIG. 8 is a diagram illustrating an example of the index server 706. Specifically, the index server 706 of FIG. 7 is depicted in more detail. The index server 706 includes a connection and session management component 800, which is responsible for creating and managing sessions and connections for the database clients (e.g. client applications 702A, 702B). Once a session is established, clients can communicate with the database system using SQL statements and/or natural language queries, as described herein. For each session, a set of session parameters 802 may be maintained, such as auto-commit, current transaction isolation level, etc. Users (e.g., system administrators, developers) may be authenticated by the database system itself (e.g., by logging in with log-in information such as a user name and password, using an authentication component 804) or authentication can be delegated to an external authentication provider such as a Lightweight Directory Access Protocol (LDAP) directory.

Client requests can be analyzed and executed by a set of components summarized as request processing and execution control 806. An SQL processor 808 checks the syntax and semantics of the client SQL statements and generates a logical execution plan. Multidimensional expressions (MDX) is a language for querying and manipulating multidimensional data stored in OLAP cubes. As such, an MDX engine 810 may be provided to allow for the parsing and executing of MDX commands. A planning engine 812 allows applications to execute basic planning operations in the database layer. One such operation is to create a new version of a dataset as a copy of an existing dataset, while applying filters and transformations.

A calculation engine 814 implements the various SQL script and planning operations. The calculation engine 814 creates a logical execution plan for calculation models derived from SQL script, MDX, planning, and domain-specific models. This logical execution plan may include, for example, breaking up a model into operations that can be processed in parallel. The data is stored in relational stores 816, which implement a relational database in main memory. Each SQL statement may be processed in the context of a transaction. New sessions are implicitly assigned to a new transaction. A transaction manager 818 coordinates database transactions, controls transactional isolation, and keeps track of running and closed transactions. When a transaction is committed or rolled back, the transaction manager 818 informs the involved engines about this event so they can execute needed actions. The transaction manager 818 also cooperates with a persistence layer 820 to achieve atomic and durable transactions. In some examples, the request processing and execution controller 806 also includes the natural language system 108 described herein.

An authorization manager 822 is invoked by other database system components to check whether the user has the specified privileges to execute the requested operations. The database system allows for the granting of privileges to users or roles. A privilege grants the right to perform a specified operation on a specified object. The persistence layer 820 ensures that the database is restored to the most recent committed state after a restart and that transactions are either completely executed or completely undone. To achieve this goal in an efficient way, the persistence layer 820 uses a combination of write-ahead logs, shadow paging, and save points. The persistence layer 820 also offers a page management interface 824 for writing and reading data to a separate disk storage 826, and also contains a logger 828 that manages the transaction log. Log entries can be written implicitly by the persistence layer 820 when data is written via the persistence interface or explicitly by using a log interface.

Figure 9:
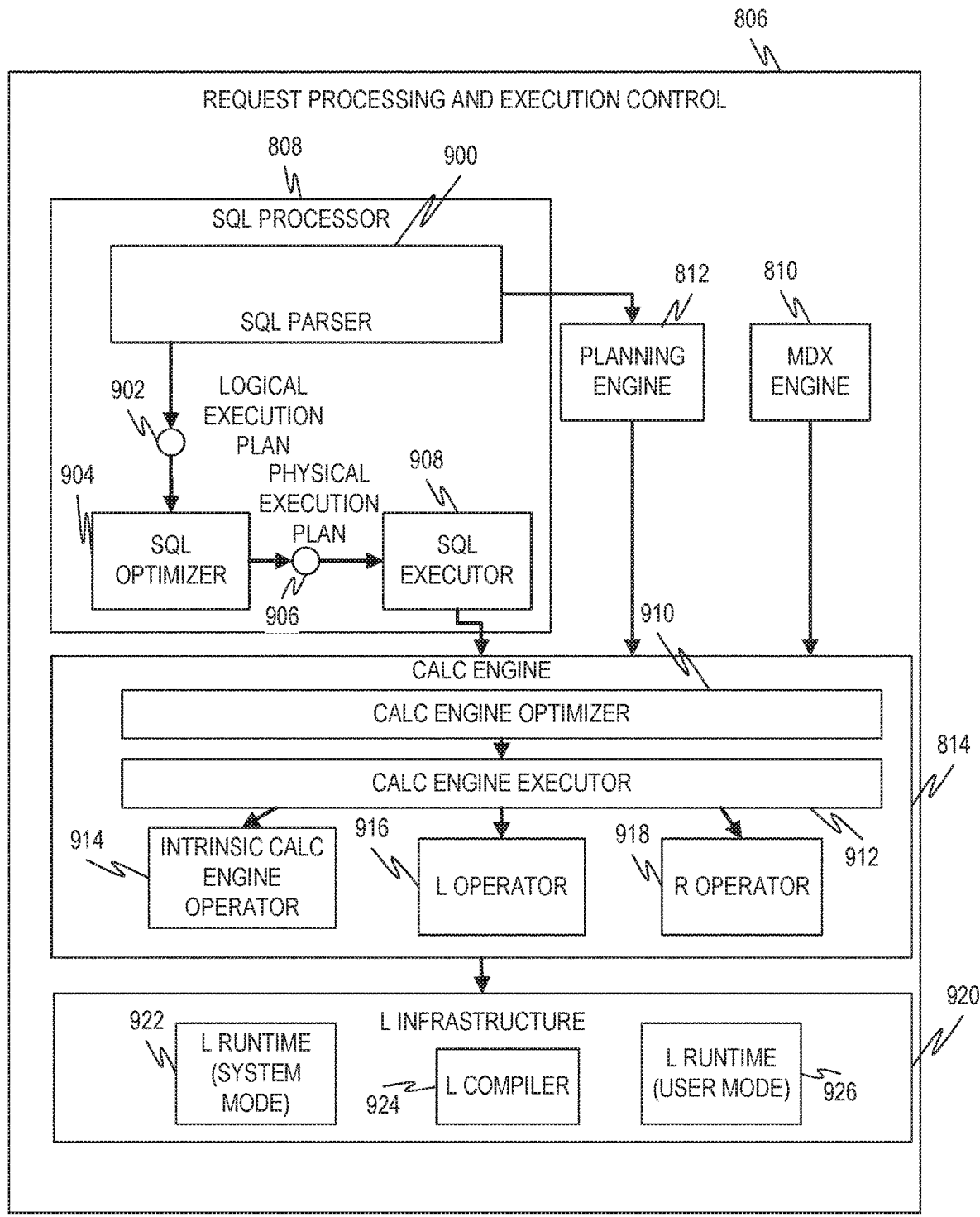
FIG. 9 is a diagram illustrating one example of the request processing and execution control of FIG. 8.

FIG. 9 is a diagram illustrating one example of the request processing and execution control 806. This diagram depicts the request processing and execution control 806 of FIG. 8 in more detail. The SQL processor 808 contains an SQL parser 900, which parses the SQL statement and generates a logical execution plan 902, which it passes to an SQL optimizer 904. The SQL optimizer 904 optimizes the logical execution plan 902 and converts it to a physical execution plan 906, which it then passes to a SQL executor 908. The calculation engine 814 implements the various SQL script and planning operations, and includes a calc engine optimizer 910, which optimizes the operations, and a calc engine executor 912, which executes the operations, as well as an intrinsic calc engine operator 914, an L operator 916, and an R operator 918.

An L infrastructure 920 includes a number of components to aid in the running of L procedures, including an L-runtime (system mode) 922, an L compiler 924, and an L-runtime (User mode) 926.

Figure 10:
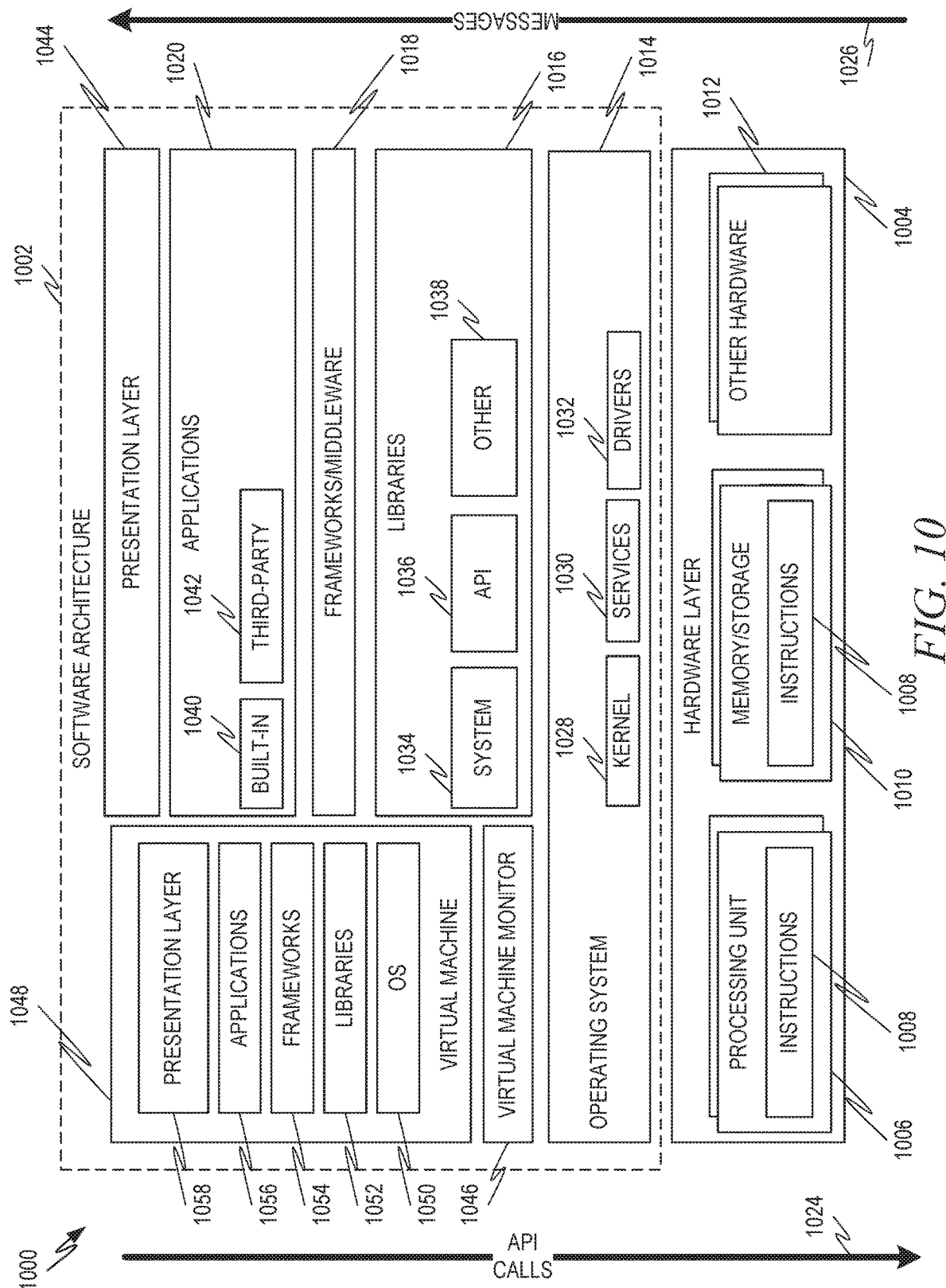
FIG. 10 is a block diagram showing one example of a software architecture for a computing device.

FIG. 10 is a block diagram 1000 showing one example of a software architecture 1002 for a computing device. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system 1100 of FIG. 11.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of computer system 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020 and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system 1034 libraries (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be utilized by the applications 1020 and/or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 includes built-in applications 1040 and/or third party applications 1042. Examples of representative built-in applications 1040 may include, but are not limited to, a contacts application, a browser application, a book reader application, a location application, a media application, a messaging application, and/or a game application. Third party applications 1042 may include any of the built in applications as well as a broad assortment of other applications. In a specific example, the third party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system 1034, APIs 1036, and other libraries 1038), frameworks/middleware 1018 to create user interfaces to interact with users of the system. Alternatively, or additionally, in some systems interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine as well as the interface with the host operating system (i.e., operating system 1014). A software architecture executes within the virtual machine such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 11:
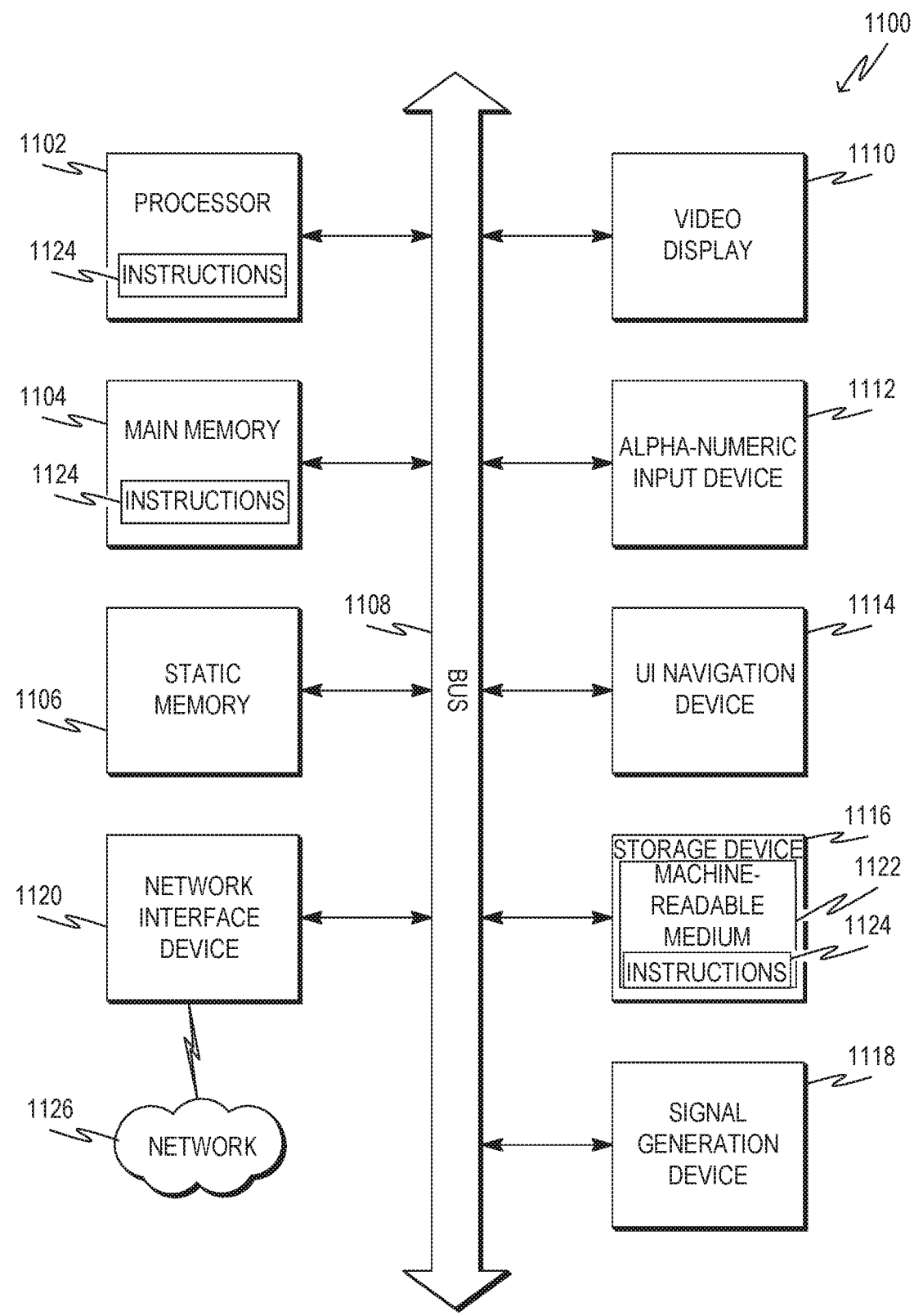
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100) within which instructions 1124 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a disk drive unit 1116, a signal generation device 1118 (e.g., a speaker), and a network interface device 1120.

Machine-Readable Medium

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

Example 1 is a database management system, comprising: at least one processor and a memory in communication with the at least one processor, wherein the at least one processor programmed to perform operations comprising: receiving a natural language query comprising a plurality of terms, wherein a first term of the plurality of terms comprises an alphanumeric string; generating a set of operators and a set of operands based at least in part on the plurality of terms, wherein the generating comprises: determining that a first term of the plurality of terms corresponds to a first operator; adding the first operator to the set of operators; determining that a second term of the plurality of terms corresponds to a first operand; and adding the first operand to the set of operands; generating an expression tree based at least in part on the set of operators and the set of operands, wherein the expression tree comprises a plurality of interconnected nodes, wherein a first node of the plurality of nodes is associated with a first function corresponding to the first operator, and wherein a second node of the plurality of nodes is associated with a first argument of the first function corresponding to the first operand; and generating a query based at least in part on the expression tree.

In Example 2, the subject matter of Example 1 optionally includes wherein the second node depends from the first node, and wherein the query comprises a call for the first function with the first argument.

In Example 3, the subject matter of any one or more of Examples 1-2 optionally includes wherein the second node depends from the first node, and wherein the at least one processor is further programmed to perform operations comprising: generating a first subtree comprising the first node and the second node; generating a second subtree; and joining the first subtree and the second subtree with a conjunctive function node.

In Example 4, the subject matter of any one or more of Examples 1-3 optionally includes wherein the set of operators comprises a plurality of operators including the first operator, and wherein the at least one processor is further programmed to perform operations comprising: generating a first subtree for the first operator; and generating a second subtree for the second operator of the plurality of operators.

In Example 5, the subject matter of Example 4 optionally includes wherein the at least one processor is further programmed to perform operations comprising: determining that a remaining operand remains after subtrees are generated for all of the operators in the set of operators; generating a first additional function node corresponding to an in function; and generating a second additional argument node that depends from the first additional function node and corresponds to the remaining operand.

In Example 6, the subject matter of any one or more of Examples 1-5 optionally includes wherein generating the query comprises: determining that the first node comprises two dependent nodes, the two dependent nodes including the second node and a third node; and generating a call for the first function to be performed on the first argument and a second argument corresponding to a second operand associated with the third node.

In Example 7, the subject matter of Example 6 optionally includes wherein the third node is associated with an operator, and wherein the second operand comprises a nested function.

In Example 8, the subject matter of any one or more of Examples 1-7 optionally includes wherein the second node depends from the first node, and wherein generating the query comprises: executing a query generation function with the first node as a current node, wherein the executing comprises: determining that the first function is a non-binary function; calling the query generation function with the second node as the current node; and returning a function call corresponding to the first function, wherein an argument of the function call comprises a result of calling of the query generation function with the second node as the current node.

In Example 9, the subject matter of Example 8 optionally includes wherein generating the query further comprises: executing the query generation function with the second node as the current node, wherein the executing comprises returning the first argument.

In Example 10, the subject matter of any one or more of Examples 1-9 optionally includes wherein a third node also depends from the first node, and wherein generating the query comprises: executing a query generation function with the first node as a current node, wherein the executing comprises: calling the query generation function with the third node as the current node; and returning a function call corresponding to the first function, wherein an argument of the function call comprises a result of calling the query generation function with the third node as the current node; and executing the query generation function with the third node as the current node, wherein the executing comprises: calling the query generation function with the third node as the current node, wherein a fourth node depends from the third node; and returning a second function call corresponding to a third function associated with the third node, wherein an argument of the second function call comprises a result of calling the query generation function with the third node as the current node.

In Example 11, the subject matter of any one or more of Examples 1-10 optionally includes wherein generating the set of operators and the set of operands further comprises determining that the first operand is associated with a first column of a first table at a database managed by the database management system.

Example 12 is a method of converting a natural language query to a structured query, the method comprising: receiving, with a processor unit, a natural language query comprising a plurality of terms, wherein a first term of the plurality of terms comprises an alphanumeric string; generating, with the processor unit, a set of operators and a set of operands based at least in part on the plurality of terms, wherein the generating comprises: determining that a first term of the plurality of terms corresponds to a first operator; adding the first operator to the set of operators; determining that a second term of the plurality of terms corresponds to a first operand; and adding the first operand to the set of operands; generating, with the processor unit, an expression tree based at least in part on the set of operators and the set of operands, wherein the expression tree comprises a plurality of interconnected nodes, wherein a first node of the plurality of nodes is associated with a first function corresponding to the first operator, and wherein a second node of the plurality of nodes is associated with a first argument of the first function corresponding to the first operand; and generating, with the processor unit, a query based at least in part on the expression tree.

In Example 13, the subject matter of Example 12 optionally includes wherein the second node depends from the first node, and wherein the query comprises a call for the first function with the first argument.

In Example 14, the subject matter of any one or more of Examples 12-13 optionally includes wherein the second node depends from the first node, further comprising: generating a first subtree comprising the first node and the second node; generating a second subtree; and joining the first subtree and the second subtree with a conjunctive function node.

In Example 15, the subject matter of any one or more of Examples 12-14 optionally includes determining that a remaining operand remains after subtrees are generated for all of the operators in the set of operators; generating a first additional function node corresponding to an in function; and generating a second additional argument node that depends from the first additional function node and corresponds to the remaining operand.

In Example 16, the subject matter of any one or more of Examples 12-15 optionally includes wherein generating the query comprises: determining that the first node comprises two dependent nodes, the two dependent nodes including the second node and a third node; and generating a call for the first function to be performed on the first argument and a second argument corresponding to a second operand associated with the third node.

In Example 17, the subject matter of Example 16 optionally includes wherein the third node is associated with an operator, and wherein the second operand comprises a nested function.

In Example 18, the subject matter of any one or more of Examples 12-17 optionally includes wherein the second node depends from the first node, and wherein generating the query comprises: executing a query generation function with the first node as a current node, wherein the executing comprises: determining that the first function is a non-binary function; calling the query generation function with the second node as the current node; and returning a function call corresponding to the first function, wherein an argument of the function call comprises a result of calling of the query generation function with the second node as the current node.

In Example 19, the subject matter of any one or more of Examples 12-18 optionally includes wherein a third node also depends from the first node, and wherein generating the query comprises: executing a query generation function with the first node as a current node, wherein the executing comprises: calling the query generation function with the third node as the current node; and returning a function call corresponding to the first function, wherein an argument of the function call comprises a result of calling the query generation function with the third node as the current node; and executing the query generation function with the third node as the current node, wherein the executing comprises: calling the query generation function with the third node as the current node, wherein a fourth node depends from the third node; and returning a second function call corresponding to a third function associated with the third node, wherein an argument of the second function call comprises a result of calling the query generation function with the third node as the current node.

Example 20 is a machine-readable medium comprising instructions thereon that, when executed by a processor unit, causes the processor unit to perform operations comprising: receiving a natural language query comprising a plurality of terms, wherein a first term of the plurality of terms comprises an alphanumeric string; generating a set of operators and a set of operands based at least in part on the plurality of terms, wherein the generating comprises: determining that a first term of the plurality of terms corresponds to a first operator; adding the first operator to the set of operators; determining that a second term of the plurality of terms corresponds to a first operand; and adding the first operand to the set of operands; generating an expression tree based at least in part on the set of operators and the set of operands, wherein the expression tree comprises a plurality of interconnected nodes, wherein a first node of the plurality of nodes is associated with a first function corresponding to the first operator, and wherein a second node of the plurality of nodes is associated with a first argument of the first function corresponding to the first operand; and generating a query based at least in part on the expression tree.

What is claimed is:

1. A database management system for managing a database, the system comprising:
   at least one processor and a memory in communication with the at least one processor, wherein the at least one processor programmed to perform operations comprising:
      receiving a natural language query comprising a plurality of terms, wherein a first term of the plurality of terms comprises a first alphanumeric string and a second term of the plurality of terms comprises a second alphanumeric string;
      generating a set of operators and a set of operands based at least in part on the plurality of terms, wherein the generating comprises:
         determining that the first term and the second term collectively correspond to a first operator;
         adding the first operator to the set of operators;
         determining that a third term of the plurality of terms corresponds to a first operand;
         adding the first operand to the set of operands;
         determining that a fourth term of the plurality of terms does not correspond to an operator; and
         determining that the fourth term does not correspond to a column at the database, wherein the fourth term is omitted from the set of operators and omitted from the set of operands;
      generating an expression tree based at least in part on the set of operators and the set of operands, wherein the expression tree comprises a plurality of interconnected nodes, wherein a first node of the plurality of nodes is associated with a first function corresponding to the first operator, and wherein a second node of the plurality of nodes is associated with a first argument of the first function corresponding to the first operand; and
      generating a query based at least in part on the expression tree.

2. The database management system of claim 1, wherein the second node depends from the first node, and wherein the query comprises a call for the first function with the first argument.

3. The database management system of claim 1, wherein the second node depends from the first node, and wherein the at least one processor is further programmed to perform operations comprising:
   generating a first subtree comprising the first node and the second node;
   generating a second subtree; and
   joining the first subtree and the second subtree with a conjunctive function node.

4. The database management system of claim 1, wherein the set of operators comprises a plurality of operators including the first operator and a second operator, and wherein the at least one processor is further programmed to perform operations comprising:
   generating a first subtree for the first operator; and
   generating a second subtree for the second operator.

5. The database management system of claim 4, wherein the at least one processor is further programmed to perform operations comprising:
   determining that a remaining operand remains after subtrees are generated for all of the operators in the set of operators;
   generating a first additional function node corresponding to an in function; and
   generating a second additional argument node that depends from the first additional function node and corresponds to the remaining operand.

6. The database management system of claim 1, wherein generating the query comprises:
   determining that the first node comprises two dependent nodes, the two dependent nodes including the second node and a third node; and
   generating a call for the first function to be performed on the first argument and a second argument corresponding to a second operand associated with the third node.

7. The database management system of claim 6, wherein the third node is associated with an operator, and wherein the second operand comprises a nested function.

8. The database management system of claim 1, wherein the second node depends from the first node, and wherein generating the query comprises:
   executing a query generation function with the first node as a current node, wherein the executing comprises:
      determining that the first function is a non-binary function;
      calling the query generation function with the second node as the current node; and
      returning a function call corresponding to the first function, wherein an argument of the function call comprises a result of calling of the query generation function with the second node as the current node.

9. The database management system of claim 8, wherein generating the query further comprises:
   executing the query generation function with the second node as the current node, wherein the executing comprises returning the first argument.

10. The database management system of claim 1, wherein a third node also depends from the first node, and wherein generating the query comprises:
    executing a query generation function with the first node as a current node, wherein the executing comprises:
       calling the query generation function with the third node as the current node; and
       returning a function call corresponding to the first function, wherein an argument of the function call comprises a result of calling the query generation function with the third node as the current node;
    and executing the query generation function with the third node as the current node, wherein the executing comprises:
       calling the query generation function with the third node as the current node, wherein a fourth node depends from the third node; and
       returning a second function call corresponding to a third function associated with the third node, wherein an argument of the second function call comprises a result of calling the query generation function with the third node as the current node.

11. The system of claim 1, wherein generating the set of operators and the set of operands further comprises determining that the first operand is associated with a first column of a first table at a database managed by the database management system.

12. A method of converting a natural language query to a structured query for execution at a database, the method comprising:

receiving, with a processor unit, a natural language query comprising a plurality of terms, wherein a first term of the plurality of terms comprises a first alphanumeric string and a second term of the plurality of terms comprises a second alphanumeric string;

generating, with the processor unit, a set of operators and a set of operands based at least in part on the plurality of terms, wherein the generating comprises:
- determining that the first term and the second term collectively correspond to a first operator;
- adding the first operator to the set of operators;
- determining that a third term of the plurality of terms corresponds to a first operand;
- adding the first operand to the set of operands;
- determining that a fourth term of the plurality of terms does not correspond to an operator; and
- determining that the fourth term does not correspond to a column at the database, wherein the fourth term is omitted from the set of operators and omitted from the set of operands;

generating, with the processor unit, an expression tree based at least in part on the set of operators and the set of operands, wherein the expression tree comprises a plurality of interconnected nodes, wherein a first node of the plurality of nodes is associated with a first function corresponding to the first operator, and wherein a second node of the plurality of nodes is associated with a first argument of the first function corresponding to the first operand; and generating, with the processor unit, a query based at least in part on the expression tree.

13. The method of claim 12, wherein the second node depends from the first node, and wherein the query comprises a call for the first function with the first argument.

14. The method of claim 12, wherein the second node depends from the first node, further comprising:
- generating a first subtree comprising the first node and the second node;
- generating a second subtree; and
- joining the first subtree and the second subtree with a conjunctive function node.

15. The method of claim 12, further comprising:
- determining that a remaining operand remains after subtrees are generated for all of the operators in the set of operators;
- generating a first additional function node corresponding to an in function; and
- generating a second additional argument node that depends from the first additional function node and corresponds to the remaining operand.

16. The method of claim 12, wherein generating the query comprises:
- determining that the first node comprises two dependent nodes, the two dependent nodes including the second node and a third node; and
- generating a call for the first function to be performed on the first argument and a second argument corresponding to a second operand associated with the third node.

17. The method of claim 16, wherein the third node is associated with an operator, and wherein the second operand comprises a nested function.

18. The method of claim 12, wherein the second node depends from the first node, and wherein generating the query comprises:
executing a query generation function with the first node as a current node, wherein the executing comprises:
- determining that the first function is a non-binary function;
- calling the query generation function with the second node as the current node; and
- returning a function call corresponding to the first function, wherein an argument of the function call comprises a result of calling of the query generation function with the second node as the current node.

19. The method of claim 12, wherein a third node also depends from the first node, and wherein generating the query comprises:
executing a query generation function with the first node as a current node, wherein the executing comprises:
- calling the query generation function with the third node as the current node; and
- returning a function call corresponding to the first function, wherein an argument of the function call comprises a result of calling the query generation function with the third node as the current node;

and executing the query generation function with the third node as the current node, wherein the executing comprises:
- calling the query generation function with the third node as the current node, wherein a fourth node depends from the third node; and
- returning a second function call corresponding to a third function associated with the third node, wherein an argument of the second function call comprises a result of calling the query generation function with the third node as the current node.

20. A machine-readable medium comprising instructions thereon that, when executed by a processor unit, causes the processor unit to perform operations comprising:
receiving a natural language query comprising a plurality of terms, wherein a first term of the plurality of terms comprises a first alphanumeric string and a second term of the plurality of terms comprises a second alphanumeric string;

generating a set of operators and a set of operands based at least in part on the plurality of terms, wherein the generating comprises:
- determining that the first term and the second term collectively correspond to a first operator;
- adding the first operator to the set of operators;
- determining that a third term of the plurality of terms corresponds to a first operand;
- adding the first operand to the set of operands;
- determining that a fourth term of the plurality of terms does not correspond to an operator; and
- determining that the fourth term does not correspond to a column at a database, wherein the fourth term is omitted from the set of operators and omitted from the set of operands;

generating an expression tree based at least in part on the set of operators and the set of operands, wherein the expression tree comprises a plurality of interconnected nodes, wherein a first node of the plurality of nodes is associated with a first function corresponding to the first operator, and wherein a second node of the plurality of nodes is associated with a first argument of the first function corresponding to the first operand; and generating a query based at least in part on the expression tree.

* * * * *